US009544311B2

(12) United States Patent
Raepple

(10) Patent No.: US 9,544,311 B2
(45) Date of Patent: Jan. 10, 2017

(54) SECURE IDENTITY PROPAGATION IN A CLOUD-BASED COMPUTING ENVIRONMENT

(71) Applicant: Martin Raepple, Lautertal (DE)

(72) Inventor: Martin Raepple, Lautertal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/542,125

(22) Filed: Nov. 14, 2014

(65) Prior Publication Data

US 2016/0142408 A1    May 19, 2016

(51) Int. Cl.
*H04L 29/06* (2006.01)
*H04L 9/32* (2006.01)

(52) U.S. Cl.
CPC ......... *H04L 63/0884* (2013.01); *H04L 9/3213* (2013.01)

(58) Field of Classification Search
CPC ........................... H04L 63/0884; H04L 9/3247
See application file for complete search history.

(56) References Cited

U.S. PATENT DOCUMENTS

| 8,745,718 | B1 * | 6/2014 | Dufel | H04L 63/0807 713/155 |
| 2005/0108575 | A1 * | 5/2005 | Yung | H04L 63/0807 726/4 |
| 2006/0206932 | A1 * | 9/2006 | Chong | H04L 63/0807 726/10 |
| 2007/0006291 | A1 * | 1/2007 | Barari | G06F 21/335 726/10 |
| 2007/0276948 | A1 | 11/2007 | Burdett et al. | |
| 2008/0196096 | A1 * | 8/2008 | Grynberg | G06F 21/33 726/9 |
| 2013/0086669 | A1 * | 4/2013 | Sondhi | G06F 21/41 726/8 |
| 2013/0254848 | A1 * | 9/2013 | Ge | G06F 21/335 726/4 |

(Continued)

OTHER PUBLICATIONS

Kanishk Mahajan, "Oracle Access Management Security Token Service" an Oracle White Paper, Dec. 2013, Oracle Corporation World Headquarters 500 Oracle Parkway, Redwood Shores, CA 94065 U.S.A., (Identity Propagation) pp. 4-13.*

(Continued)

*Primary Examiner* — Luu Pham
*Assistant Examiner* — Harvey Cohen
(74) *Attorney, Agent, or Firm* — Fish & Richardson P.C.

(57) ABSTRACT

The present disclosure describes methods, systems, and computer program products for providing secure identity propagation in a cloud-based computing environment. One computer-implemented method includes receiving, from a user, a first security response message, transmitting, to the user in response to receiving the first security response message, a second security response message, wherein the second security response message comprises a Token Granting Token (TGT), receiving, from a cloud application, a Service Token (ST) request, wherein the ST request comprises the TGT, verifying the ST request based on the TGT, generating, in response to the verifying, a ST, wherein the ST is used to validate an access request to access a backend system, and transmitting the ST to the cloud application.

17 Claims, 4 Drawing Sheets

(56) References Cited

U.S. PATENT DOCUMENTS

| | | | |
|---|---|---|---|
| 2014/0075188 A1* | 3/2014 | Yin | H04L 63/0807 |
| | | | 713/168 |
| 2015/0012977 A1* | 1/2015 | Huh | G06F 9/468 |
| | | | 726/4 |
| 2015/0358319 A1* | 12/2015 | Taveau | G06F 21/30 |
| | | | 705/44 |
| 2016/0006629 A1* | 1/2016 | Ianakiev | G06F 21/32 |
| | | | 709/224 |

OTHER PUBLICATIONS

Cooper, Network Working Group, RFC 5280—Internet X.509 Public Key Infrastructure Certificate and Certificate Revocation List (CRL) Profile, May 2008.*

Herzberg et al., DNS Authentication as a Service Preventing amplication attacks, ACM, Dec. 2014, pp. 356-365.*

He et al., Next Stop Cloud Understanding Modern WebService Deployment, ACM Dec. 2013, pp. 177-190.*

Lomotey, SaaS Authentication Middleware Mobile Consumers of IaaS Cloud, IEEE 2013, pp. 448-455.*

Stihler et al., Integral Federated ID Management Cloud Computing, IEEE 2012, pp. 978-983.*

Josang, Identity Management Trusted Interaction Internet, IET Information Security vol. 8, Issue 2, Mar. 2014, pp. 67-79.*

Habiba et al., Assessment Criteria for Cloud Identity Management Systems, IEEE, 2013, pp. 188-195.*

Hamdi, Security of Cloud Computing Storage Networking, IEEE, 2012, pp. 1-5.*

* cited by examiner

SECURE IDENTITY PROPAGATION IN A CLOUD-BASED COMPUTING ENVIRONMENT

BACKGROUND

Organizations today use cloud-based services to run their enterprise applications. In many cases, those applications require the integration with internal backend systems that run in the organization's data center, such as an Enterprise Resource Planning (ERP) system. In such a hybrid cloud scenario, the cloud application typically requires the user to authenticate with their credentials, such as a username and password, biometric information, and/or other credentials. Verification of the user's credentials is usually delegated to a trusted identity provider (IDP) that manages the user's account, e.g., a corporate IDP like the organization's user directory. A common and standardized protocol for delegating the authentication to the IDP is the Security Assertion Markup Language (SAML) 2.0.

SUMMARY

The present disclosure relates to computer-implemented methods, computer-readable media, and computer systems for secure identity propagation in a cloud-based computing environment. One computer-implemented method includes receiving, from a user, a first security response message, transmitting, to the user in response to receiving the first security response message, a second security response message, wherein the second security response message comprises a Token Granting Token (TGT), receiving, from a cloud application, a Service Token (ST) request, wherein the ST request comprises the TGT, verifying the ST request based on the TGT, generating, in response to the verifying, a ST, wherein the ST is used to validate an access request to access a backend system, and transmitting the ST to the cloud application.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the first security response message is generated by an Identity Provider (IDP).

A second aspect, combinable with any of the previous aspects, wherein the TGT comprises a TGT digital signature, and wherein the verification of the ST request is based on the TGT digital signature.

A third aspect, combinable with any of the previous aspects, wherein the TGT further comprises a lifetime parameter, and wherein the verification is further based on the lifetime parameter.

A fourth aspect, combinable with any of the previous aspects, wherein the ST comprises a ST digital signature that is used in validating the access request.

A fifth aspect, combinable with any of the previous aspects, wherein the ST further comprises a lifetime parameter, and wherein the lifetime parameter is used in the validation.

A sixth aspect, combinable with any of the previous aspects, wherein the second security response message is transmitted on a cloud platform that hosts the cloud application.

A seventh aspect, combinable with any of the previous aspects, wherein the first and the second security response messages are formatted according to the Security Assertion Markup Language (SAML) response message.

The subject matter described in this specification can be implemented in particular implementations so as to realize one or more of the following advantages. First, propagating a secure identity according to the methods and systems described herein includes a trusted Secure Token Service (STS) that generates and verifies STs and TGTs. This trusted STS may ensure that the STs and TGTs are issued for the IDP-authenticated user in the cloud application, and thereby shields the responsibilities of generating secure tokens away from the cloud applications. Second, this approach reduces restrictions by a cloud provider on the cloud application in order to make the cloud application a more trustworthy system for generating security tokens. Therefore, this approach enhances the usability of the application and the developer's flexibility in developing the application. Third, the SAML standard originally designed for Single Sign-On (SSO) scenarios may be extended to securely propagate authenticated user identity from the cloud application to another system (e.g., a backend system on the customer's internal network). This approach extends the use and functionality of the SAML protocols that remains compatible with the SAML standards, e.g., the SAML 2.0 standard.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

Organizations today use cloud-based services to run their enterprise applications. In many cases, those applications require the integration with internal backend systems that run in the organization's data center, such as an Enterprise Resource Planning (ERP) system. In such a hybrid cloud scenario, the cloud application typically requires the user to authenticate with their secret credentials, such as a username and password. Verification of the user's credentials is usually delegated to a trusted identity provider (IDP) that manages the user's account, e.g., a corporate IDP like the organization's user directory. A common and standardized protocol for delegating the authentication to the IDP is the Security Assertion Markup Language (SAML) 2.0.

In general, access to the backend system requires an authenticated user. To avoid asking the user again for their backend credentials, the cloud application may propagate the already authenticated user to the backend system. A common technique to propagate the user is a security token that represents the user's identity. However, according to SAML standards, a cloud application may not reuse an already consumed security token. In other words, although the cloud application received such a security token, e.g., the SAML Assertion, from the IDP in the course of a successful SAML-based login, the cloud application may not propagate the security token to the backend system.

Therefore, a new security token may be generated and issued for the user by the cloud application. The new security token may be signed by the cloud application. However, the cloud application is an unsuitable place for performing such a highly sensitive security task. For example, a malicious application may be able to access the local file system or open network connections to read the confidential key that is used to generate the token signature. The malicious application could then emulate an arbitrary user independent of whether this user is actually authenticated.

Note that the described secure identity propagation system should not limit the described subject matter to the illustrated examples. In other possible implementations, there can be a specific system for the generation, issuance, and application of the TGT and the ST.

Figure 1:
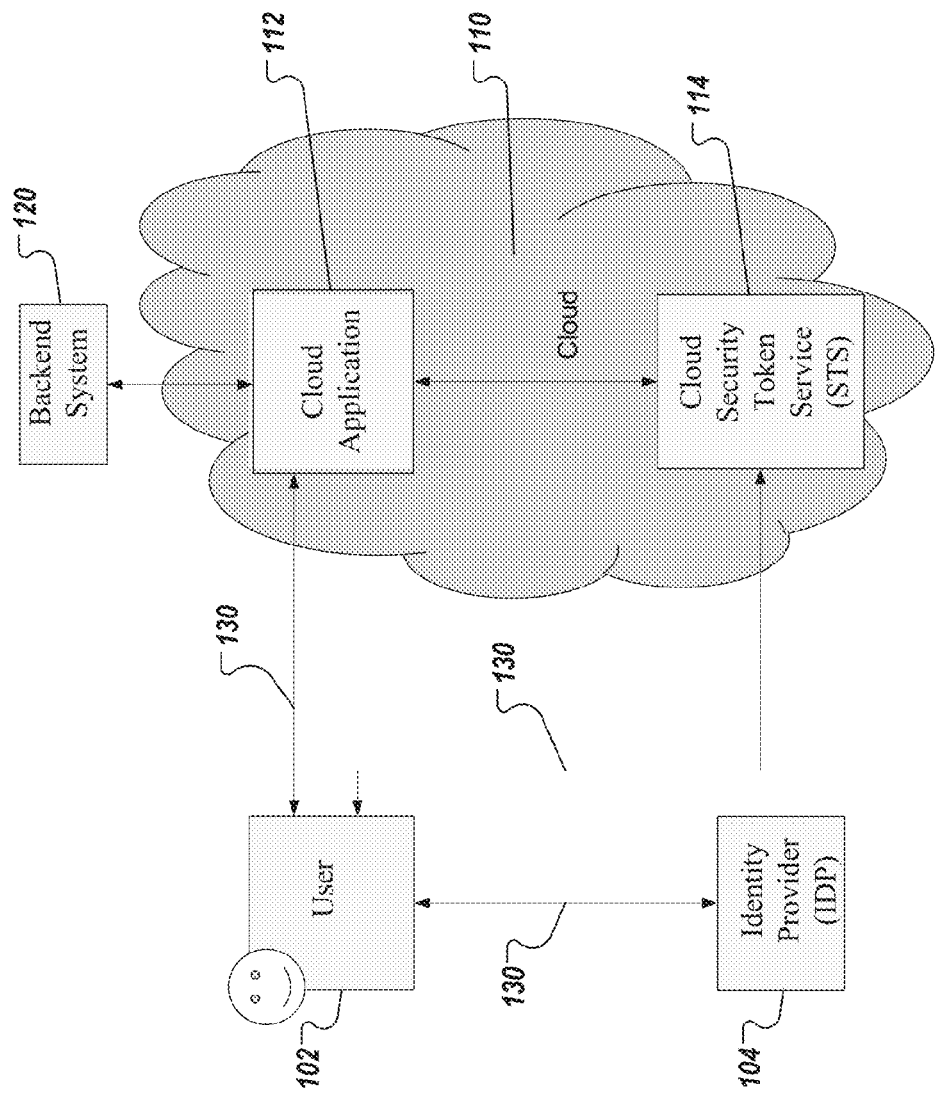
FIG. 1 is a high-level architecture block diagram illustrating a secure identity propagation system according to an implementation.

FIG. 1 is a high-level architecture block diagram illustrating a secure identity propagation system 100 for implementing a secure identity propagation process according to an implementation. At a high level, the illustrated secure identity propagation system 100 includes or is made up of one or more communicably coupled computers (e.g., the computer described in FIG. 4) that communicate across a network 130 (note that although only three network 130 connections have been labeled in FIG. 1, one or more of the other indicated connections between components can also be considered part of network 130). In some implementations, the secure identity propagation system 100 or portions of the secure identity propagation system 100 can operate within a cloud-computing-based environment. The illustrated secure identity propagation system 100 includes a user 102 that is communicably coupled with an IDP 104 and a cloud 110 over the network 130. The cloud 110, which includes a cloud application 112 and a cloud STS 114, is further communicably coupled with a backend system 120. The described illustration is only one possible implementation of the described subject matter and is not intended to limit the disclosure to the single described implementation. Those of ordinary skill will appreciate the fact that the described components can be connected, combined, and used in alternative ways consistent with this disclosure.

The user 102 is any person, device, or program that intends to access the backend system 120 through the cloud 110. The user 102 can interact with the cloud 110 and the IDP 104 through a web browser, a mobile client, or any other client software that is located at a client site. In some cases, the user 102 is an authorized user to access the backend system 120. For example, the user 102 can be an employee or an authorized customer of a corporation that controls the backend system 120.

The backend system 120 represents an application, set of applications, software, software modules, and/or combination of software and hardware that provides backend services to the user 102 through the cloud 110. In some cases, the backend system 120 can provide enterprise services to the user 102. For example, the backend system 120 can part of the internal network of a corporation. The user 102 can be an employee or a customer of the corporation and can access the backend system 120 to perform enterprise operations. For example, the backend system 120 can be internal to a corporation's data center, such as an Enterprise Resource Planning (ERP) system.

Figure 2:
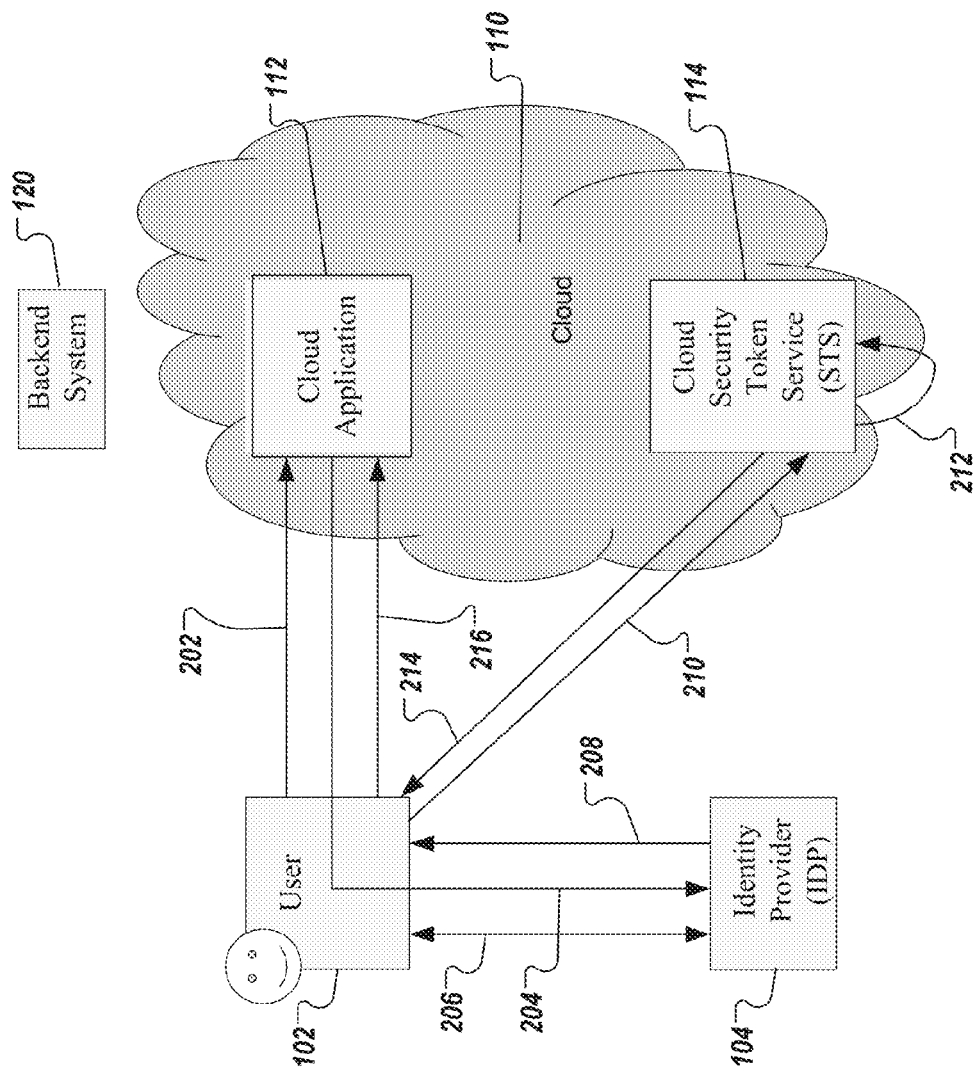
FIG. 2 is a flow diagram of a method illustrating a Token Granting Token (TGT) issuing process according to an implementation.
Figure 3:
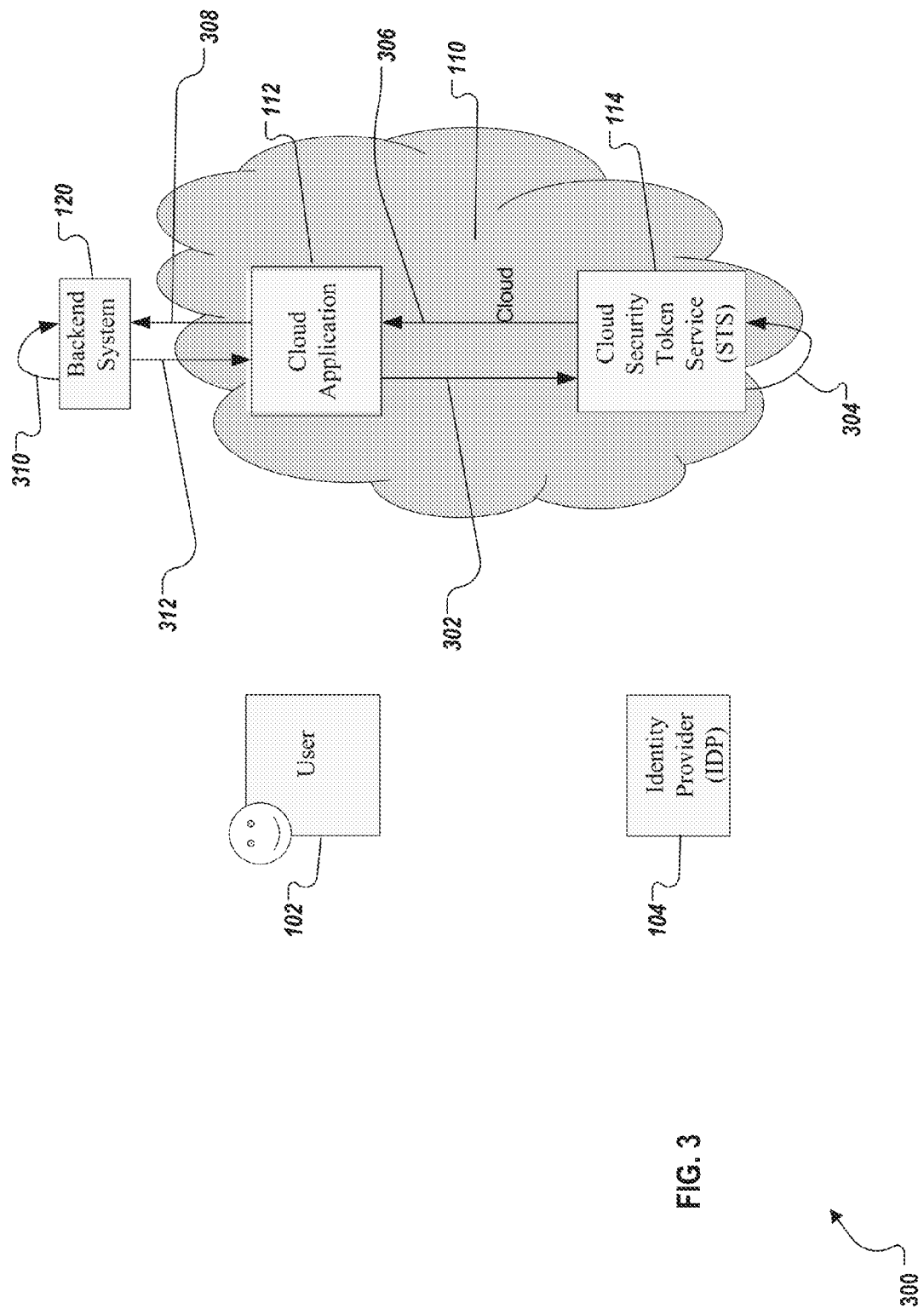
FIG. 3 is a flow diagram of a method illustrating a Service Token (ST) issuing and application process according to an implementation.

In some cases, the backend system 120 can authenticate the user 102 before providing user access to the enterprise service. Before the backend system can authorize a user, it must authenticate the user which is possible base on the information in a Security Token (ST). In these or other cases, the backend system 120 can perform the authentication based on the ST and the ST can be signed by an STS. FIGS. 2-3 and associated descriptions provide detailed descriptions of these processes.

The IDP 104 represents an application, set of applications, software, software modules, or combination of software and hardware that acts as an IDP. In some implementations, the IDP 104 follows a common and standardized protocol, e.g., the Security Assertion Markup Language (SAML) 2.0, for delegating the authentication to the IDP 104. The IDP 104 manages users' account information and can verify user 102's credentials. For example, the IDP 104 can be a corporate IDP like the organization's user directory. The IDP 104 can store secret user information such as username, password, and answers to security questions. When the IDP 104 receives a security request, the IDP 104 can verify the user 102 by comparing the user credentials entered by the user 102 with the stored account information of the user 102. Upon the successful verification of the user 102, the IDP 104 can send a security response message which can be used to generate a Token Granting Token (TGT), used to generate an ST. FIGS. 2-3 and associated descriptions provide detailed descriptions of these processes.

The cloud 110 can be any cloud platform that provides the user 102 access to the cloud application 112. Examples of the cloud 110 can include HANA cloud platform, Microsoft Azure cloud platform, and/or Google Application Engine. As illustrated, the cloud 110 includes a cloud application 112 and a cloud Secure Token Service (STS) 114.

The cloud application 112 represents an application, set of applications, software, software modules, or combination of software and hardware that provides enterprise services to the user 102. For example, the cloud application 112 can execute work flow, enable collaborations between users, or retrieve enterprise data. In some cases, the cloud application 112 can access the backend system 120 to perform the enterprise services. In such a case, the cloud application 112 can make a backend call to request access to the backend system 120 on behalf of the user 102. In some implementations, the backend call can include a ST that is digitally signed by the cloud STS 114. The backend system 120 can verify the user 102 based on the ST and grant access.

The cloud 110 also includes the cloud STS 114. The cloud STS 114 represents an application, set of applications, software, software modules, and/or combination of software and hardware that verifies the user 102 and issues the TGT and the ST for the user 102. In some implementations, the cloud STS can follow a common and standardized protocol, e.g., the Security Assertion Markup Language (SAML) 2.0, for providing security verifications. The cloud STS 114 maintains a trusted relationship with the IDP 104, and therefore can authenticate a first security response message that is generated by the IDP 104, which indicates that the user 102 has been verified by the IDP 104. Upon authentication, the cloud STS 114 can generate a second security response message based on the first security response message. The cloud STS 114 can also include a TGT in the second security response message. The cloud STS 114 also maintains a trusted relationship with the cloud application 112. Therefore, the cloud STS 114 can authenticate the ST request from the cloud application 112. Upon authentication, the cloud STS 114 can generate and send a ST to the cloud application 112. Furthermore, the cloud STS 114 maintains a trusted relationship with the backend system 120. Therefore, the backend system 120 can authenticate the backend call from the cloud application 112 based on the ST generated by the cloud STS 114. FIGS. 2-3 and associated descriptions provide detailed descriptions of these processes.

Maintaining the cloud STS 114 as an entity that is separated from the cloud application 112 can provide one or more advantages. For example, this approach shields the generations and verifications of security tokens away from the cloud application 112. This approach not only reduces the complexities of cloud application 112, but also mitigates security concerns for malicious cloud applications. In addition, the cloud STS 114 can be a security application that is maintained by the cloud provider of the cloud 110, which can provide additional security safeguard for the cloud STS 114. In the illustrated example, the cloud STS 114 is located on the same cloud that hosts the cloud application 112. This approach can reduce the communication latency between the cloud STS 114 and the cloud application 112 and improve the efficiency of the signal exchanges. In some implementations, the cloud STS 114 can be located at/associated with a different entity from the cloud 110.

The network 130 facilitates wireless or wireline communications between the components of the example system 100 (e.g., between the user 102 and the IDP 104, the cloud STS 114, and the cloud application 112), as well as with any other local or remote computer, such as additional clients, servers, or other devices communicably coupled to network 130, including those not illustrated in FIG. 1. In the illustrated environment, the network 130 is depicted as a single network, but can be comprised of more than one network without departing from the scope of this disclosure, so long as at least a portion of the network 130 can facilitate communications between senders and recipients. In some instances, one or more of the illustrated components can be included within network 130 as one or more cloud-based services or operations.

While portions of the software elements illustrated in FIG. 1 are shown as individual modules that implement the various features and functionality through various objects, methods, or other processes, the software can instead include a number of sub-modules, third-party services, components, libraries, and such, as appropriate. Conversely, the features and functionality of various components can be combined into single components as appropriate.

FIG. 2 is a flow diagram of a method 200 illustrating a Token Granting Token (TGT) issuing process according to an implementation. For clarity of presentation, the description that follows generally describes method 200 in the context of FIGS. 1 and 3-4. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

At 202, the user 102 accesses a protected resource in the cloud application 112. This step initiates an authentication process by the cloud application 112 to authenticate the user.

At 204, the cloud application 112 sends a security request message to request authentication information of the user 102. In the illustrated example, the cloud application 112 sends a SAML Request message to an IDP 104. In some implementations, the SAML request message is routed through a web browser at the user 102 to the IDP 104. The SAML request message can include an STS URL as the Assertion Consumer Service (ACS) endpoint. The following represents an example SAML request message:

```
<AuthnRequest ...
        AssertionConsumerServiceURL="https://sts.hana.ondemand.com/saml2/acs">
    <ns2:Issuer>cloudapp.acme.com</ns2:Issuer>
    <ds:Signature xmlns:ds="http://www.w3.org/2000/09/xmldsig#">
        ...
    </ds:Signature>
</AuthnRequest>.
```

At 206, the IDP 104 authenticates the user 102. In some implementations, the IDP 104 authenticates the user 102 by verification of the credentials of the user 102 with the stored credential information. For example, the IDP 104 can ask the user 102 to enter a username and password to authenticate the user 102.

At 208, the IDP 104 sends a first security response message to the user 102 to indicate a successful authentication. In some implementations, the first security response message can be SAML Response$_{IDP}$ message. The SAML Response$_{IDP}$ message can include a FORM element in a HTML page. The FORM element can include a hidden field according to the SAML 2.0 Web Single Sign-On (SSO) profile. The HTML page can include script code that will automatically post the FORM to the ACS URL specified at 204. The SAML Response$_{IDP}$ message can include a SAML Assertion$_{IDP}$. The following represents an example SAML Response$_{IDP}$ message, including the SAML Assertion$_{IDP}$.

Assertion$_{IDP}$ in the SAML Response$_{IDP}$ message to generate a SAML Assertion$_{STS}$. The cloud STS 114 can include the

```
Response xmlns="urn:oasis:names:tc:SAML:2.0:protocol" ...>
        <ns2:Issuer>idp.acme.com</ns2:Issuer>
        <Status>
            <StatusCode
Value="urn:oasis:names:tc:SAML:2.0:status:Success" /> (SAML Assertion_IDP)
        </Status>
        <Assertion xmlns="urn:oasis:names:tc:SAML:2.0:assertion" ...>
            <Issuer>idp.acme.com</Issuer>
            <ds:Signature
xmlns:ds="http://www.w3.org/2000/09/xmldsig#">
                ...
            </ds:Signature>
            <Subject>
                <NameID
Format="urn:oasis:names:tc:SAML:1.1:nameid-format:unspecified">john.doe</NameID>
                <SubjectConfirmation
Method="urn:oasis:names:tc:SAML:2.0:cm:bearer">
                    <SubjectConfirmationData
InResponseTo="Sd9530e5a-be1-45c3-b873"
NotOnOrAfter="2014-08-27T08:02:15.692Z"
Recipient="https://sts.hana.ondemand.com/saml2/acs"
                    />
                </SubjectConfirmation>
            </Subject>
            <Conditions ...>
                <AudienceRestriction>
    <Audience>cloudappacme.hana.ondemand.com</Audience>
                </AudienceRestriction>
            </Conditions>
            <AuthnStatement ...>
            ...
            </AuthnStatement>
            <AttributeStatement>
                <Attribute Name="mail">
    <AttributeValue ...>john.doe@acme.com</AttributeValue>
                </Attribute>
                <Attribute Name="first_name">
    <AttributeValue ...>John</AttributeValue>
                </Attribute>
                <Attribute Name="last_name">
    <AttributeValue ...>Doe</AttributeValue>
                </Attribute>
            </AttributeStatement>
        </Assertion>
</Response>
```

At 210, the user 102 sends the first security response message to the cloud STS 114. In some implementations, the first security response message is a SAML Response$_{IDP}$ message. The user 102 can post the SAML Response$_{IDP}$, via a web browser, to the cloud STS 114 by using the STS ACS endpoint specified at 204.

At 212, the cloud STS 114 generates a second security response message. In the illustrated example, the cloud STS 114 uses the information obtained from the first security response message, e.g., the SAML Response$_{IDP}$ message, received at 210 to generate the second security response message. For example, the cloud STS 114 can use SAML Assertion$_{STS}$ in the second security response message, e.g., a SAML Response$_{STS}$ message. The cloud STS 114 can set the Recipient attribute to the identifier of the cloud application 112, which can be determined based on the SAML Response$_{IDP}$ Audience element value, or from a domain cookie set by the cloud application 112 with the security request message in 204. If a domain cookie is used, the cloud STS 114 and cloud application 112 can be in the same DNS domain. The following represents an example SAML Response$_{STS}$ message, including the SAML Assertion$_{STS}$.

```
<Response xmlns="urn:oasis:names:tc:SAML:2.0:protocol" ...>
        <ns2:Issuer>idp.acme.com</ns2:Issuer>
        <Status>
            <StatusCode
Value="urn:oasis:names:tc:SAML:2.0:status:Success" /> (SAML Assertion_STS)
        </Status>
        <Assertion xmlns="urn:oasis:names:tc:SAML:2.0:assertion" ...>
            <Issuer>idp.acme.com</Issuer>
            <ds:Signature
xmlns:ds="http://www.w3.org/2000/09/xmldsig#">
                ...
            </ds:Signature>
            <Subject>
```

```
            <NameID
Format="urn:oasis:names:tc:SAML:1.1:nameid-format:unspecified">john.doe</NameID>
            <SubjectConfirmation
Method="urn:oasis:names:tc:SAML:2.0:cm:bearer">
                <SubjectConfirmationData
InResponseTo="Sd9530e5a-be18-45c3-b873"
NotOnOrAfter="2014-08-27T08:02:15.692Z"
Recipient="https://sts.hana.ondemand.com/saml2/acs"
                />
            </SubjectConfirmation>
        </Subject>
        <Conditions ...>
            <AudienceRestriction>
    <Audience>cloudappacme.hana.ondemand.com</Audience>
            </AudienceRestriction>
        </Conditions>
        <AuthnStatement ...>
        ...
        </AuthnStatement>
        <AttributeStatement>
            <Attribute Name="mail">
    <Attribute Value ...>john.doe@acme.com</AttributeValue>
            </Attribute>
            <Attribute Name="first_name">
    <AttributeValue ...> John</AttributeValue>
            </Attribute>
            <Attribute Name="last_name">
    <AttributeValue ...>Doe</AttributeValue>
            </Attribute>
        </AttributeStatement>
    </Assertion>
</Response>
```

The SAML Assertion$_{STS}$ can include an additional security token generated by the cloud STS 114. In the illustrated example, the additional security token is a Token Granting Token (TGT). In some implementations, the TGT can be a SAML Assertion Attribute. The TGT can include additional security information. The additional information in the TGT can include a unique name of the TGT issuer, e.g., the cloud STS 114. The additional security information in the TGT can also include the subject name of the IDP-authenticated user 102. The cloud STS 114 can set the subject name to the value of the NameID element in the SAML Response$_{IDP}$. In some cases, the additional security information in the TGT can also include other user identity information provided by the IDP in the SAML Assertion$_{STS}$, such as the user's first name, the user's last name, the user's department, the user's organization, and/or other information about the user 102. The additional security information in the TGT can also include a unique identifier of the TGT and a unique identifier of the recipient that the TGT is intended for, e.g., the cloud application 112. The cloud STS 114 can set the unique identifier of the recipient to the value of the Audience element in the SAML Response$_{IDP}$.

In some implementations, the additional security information in the TGT can include a lifetime value for the TGT. The association of the TGT to the IDP-authenticated user 102 can persist until the lifetime indicated by the lifetime value expires. In some cases, a malicious cloud application may cache the TGT for users who successfully authenticated at the IDP 104. The malicious application could use the cached TGT to make authorized calls to the backend system 120 on behalf of these users. Setting a lifetime for the TGT may mitigate this risk.

The additional security information in the TGT can also include a STS digital signature. The STS digital signature is generated by the cloud STS 114 and covers the additional security information in the TGT. The following represents an example TGT in the JSON Web Token (JWT) Format that can be processed according to the JSON Web Signature (JWS) specification:

```
{
    "iss": "sts.hana.ondemand.com",
    "sub": "john.doe",
    "jti":"Sd9530e5a-be18-45c3-b873-34c8d10cdb3f,
    "aud": "https://cloudappacme.hana.ondemand.com",
    "exp": "1219831243"
}
```

At 214, the cloud STS 114 sends the second security response message to the user 102. For example, the cloud STS 114 can send a HTML page with a FORM element that contains a hidden field with the SAML Response$_{STS}$ message according to the SAML 2.0 Web SSO profile. The HTML page can include script code that will automatically post the FORM to the ACS URL of the cloud application 112. Similar to how the Recipient attribute is set in 212, the ACS URL of the FORM element can be determined by the SAML Response$_{IDP}$ Audience element or a domain cookie.

At 216, the user 102 sends the second security response message to the cloud application 112. For example, the user 102's Web Browser can post the SAML Response$_{STS}$ to the cloud application 112's ACS endpoint. The cloud application 112 can log in the user 102 and create a new user session. The user principal (object) of this session will be populated with the information found in the SAML Assertion$_{STS}$ of the SAML Response$_{STS}$. The TGT from the SAML Attribute "TokenGrantingToken" in the SAML Assertion$_{STS}$ can be set as a session attribute to make it available for the backend system call during the ST issuing and application process described in FIG. 3 and associated descriptions.

In some implementations, the messages described in FIG. 2 can be transmitted over an encrypted channel. This approach can mitigate the risk of known network attacks such as replay attack, sniffing, or similar man-in-the-middle attacks.

FIG. 3 is a flow diagram of method 300 illustrating a Service Token (ST) issuing and application process according to an implementation. For clarity of presentation, the description that follows generally describes method 300 in the context of FIGS. 1-2 and 4. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, and/or in any order.

At 302, the cloud application 112 sends a Service Token (ST) request to the cloud STS 114. The ST is used to authorize a backend call to the backend system 120 for the user 102. In the illustrated example, the TGT obtained by the cloud application 112 at 216 in FIG. 2 can be used to request the ST from the cloud STS 114. The TGT, however, is not used directly as a service token to authorize the backend call. The ST request can use an internal format. The ST request can also follow existing standards for interacting with an STS, such as the WS-Trust protocol. The ST request can indicate the target (e.g., the backend system 120) where the ST will be used. From 302, method 300 proceeds to 304.

At 304, the cloud STS 114 verifies the TGT received in the ST request by validating the STS digital signature included in the TGT. In some implementations, the cloud STS 114 can keep an audit log record of the TGT issued in the TGT issuing process illustrated in FIG. 2. Further, the cloud STS 114 can maintain a list of targets that the cloud application 112 can request access to. The cloud STS can deny a ST request from the cloud application 112 if the target backend system is not registered for the cloud application 112.

The cloud STS 114 can consult with the audit log record to verify the TGT. In some cases, the TGT includes a lifetime value. In such a case, the cloud STS 114 can further verify whether the lifetime of the TGT has expired based on the lifetime value. If the STS digital signature is valid and, in the case that the TGT includes a lifetime value, the lifetime of TGT has not expired, the TGT is verified.

Upon successful verification, the STS can generate a Service Token (ST). The ST can include additional ST information. The additional ST information can include a unique name of the ST issuer, i.e., the cloud STS 114. The additional ST information can also include the subject name of the authenticated user associated with the TGT used to request the ST. This subject name can be the same as the subject name of the TGT. In some cases, the additional ST information can also include other user identity information provided by the TGT, such as the user's first name, last name, department, organization, and/or other additional ST information. The additional ST information can further include a unique identifier of the ST and a unique identifier of the intermediate recipient that the ST is intended for, i.e., the cloud application 112. The additional ST information can include a unique identifier of the ultimate target the ST is consumed for propagating the user's identity, i.e., the backend system 120.

In some implementations, the additional ST information can include a ST lifetime value. The association of the ST to the IDP-authenticated user 102 can persist until the ST lifetime indicated by the ST lifetime value expires. In some cases, a malicious cloud application can cache the ST for users who successfully authenticated at the IDP 104 and the cloud STS 114. The malicious application could use the cached ST to make authorized calls to the backend system 120 on behalf of these users. Setting a lifetime for the ST can mitigate this risk. In some implementations, the TGT can have a longer lifetime than the ST, to avoid repeating the TGT issuing process illustrated in FIG. 2. The ST token can have a short lifetime because it is likely to be used immediately after requesting it from the cloud STS 114.

Furthermore, the additional information can include a ST digital signature. The ST digital signature is generated by the cloud STS 112 to cover the additional ST information included in the ST. The following represents an example ST in the JSON Web Token (JWT) Format that can be processed according to the JWS specification (e.g., to add a signature). In the example, a private (unregistered) claim name (e.g., in the form of "http://hana.ondemand.com/target") is used to specify the intended target where the ST will ultimately be sent to for propagating the user:

```
{
    "iss": "sts.hana.ondemand.com",
    "sub": "john.doe",
    "jti":"as234e5a-34gf-aske-bgen-9kldja08923f,
    "aud": "https://cloudappacme.hana.ondemand.com",
    "exp": "2139081231",
    "http://hana.ondemand.com/target": "https://erp.acme.com"
}
```

From 304, method 300 proceeds to 306.

At 306, the cloud STS 114 sends a ST response to the cloud application 112. The ST response includes the ST generated at 304. This ST message can have an internal format or can follow existing standards for interacting with an STS, such as the WS-Trust protocol. From 306, method 300 proceeds to 308.

At 308, the ST is passed to the backend system 120 to authorize a backend call. Therefore, the security identity of the user 102 is propagated to the backend system 120. The ST may be bound to the backend system 120 because the ST digital signature in the ST covers the target of the ST. Therefore, the cloud application 112 may not cache the ST and use the cached ST to access other backend systems. From 308, method 300 proceeds to 310.

At 310, the backend system 120 validates the backend call. The backend system 120 performs the validation by verifying the ST digital signature included in the ST. If the ST also includes a ST lifetime value, the backend system 120 can also verify whether the ST lifetime has expired based on the ST lifetime value. Upon successful validation, the user 102 is logged on to the backend system 120, and the backend call can be processed in the context of the user 102. From 310, method 300 proceeds to 312.

At 312, the backend system 120 sends a response to the cloud application 112. In some implementations, the response can indicate that the user 102 has been validated. In some cases, the response can include data or any other information that is requested by the backend call at 308. After 312, method 300 stops.

In some implementations, the messages described in FIG. 3 can be transmitted over an encrypted channel. This approach may mitigate the risk of network attacks such as a replay attack and sniffing (or similar man-in-the-middle attacks) and/or other network attacks.

Figure 4:
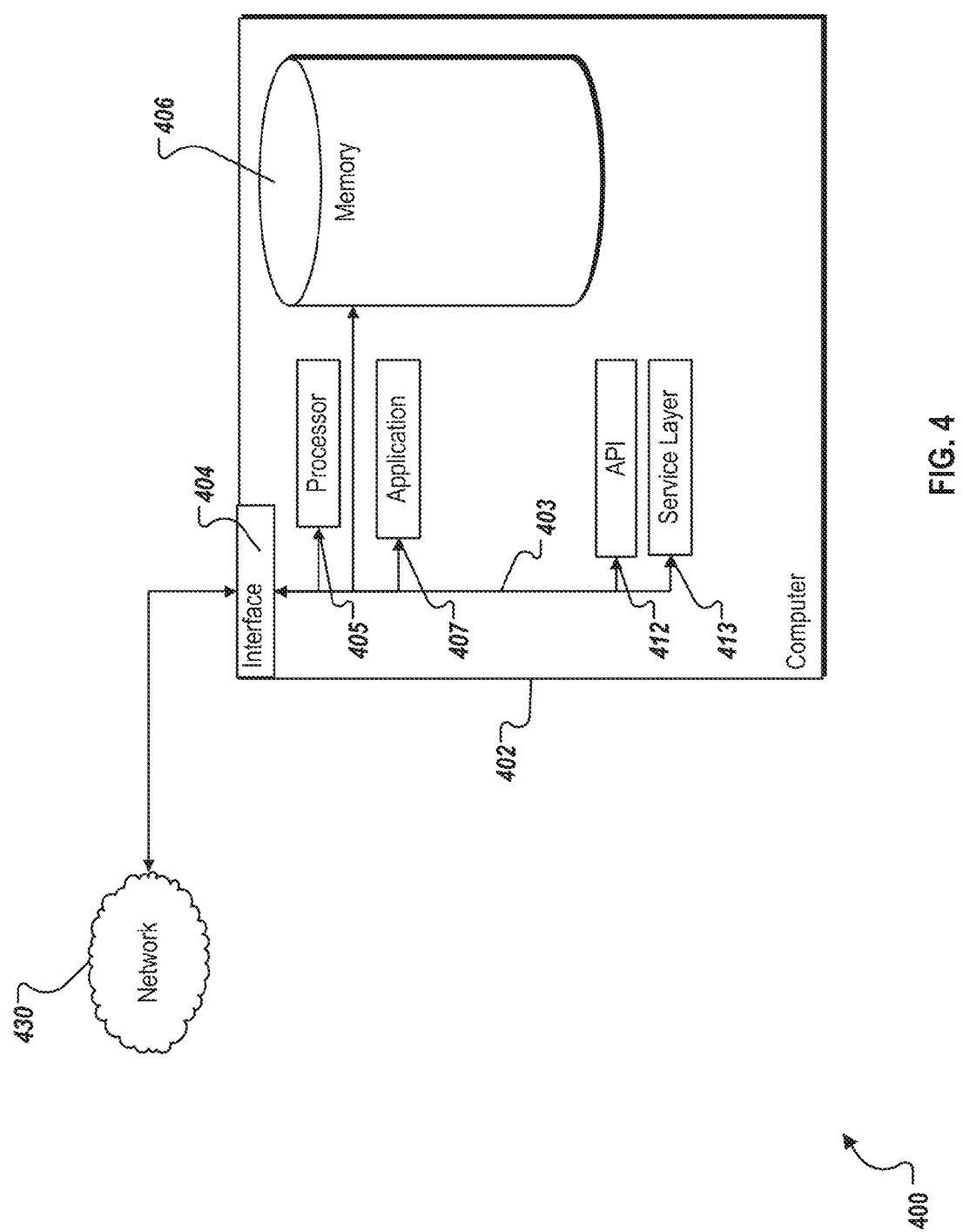
FIG. 4 is a block diagram of an exemplary computer used in the secure identity propagation system according to an implementation.

FIG. 4 is a block diagram 400 of an exemplary computer used in the secure identity propagation process according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 402 may comprise a computer that includes an input device, such as a keypad, keyboard, touch screen, or other device that can accept user information, and an output device that conveys information associated with the operation of the computer 402, including digital data, visual and/or audio information, or a GUI.

The computer 402 can serve as a client (e.g., the user 102), network component, a server, a database or other persistency, and/or any other component of the secure identity propagation system 100. The illustrated computer 402 is communicably coupled with a network 430 (e.g., the network 130). In some implementations, one or more components of the computer 402 may be configured to operate within a cloud-computing-based environment.

At a high level, the computer 402 is an electronic computing device operable to receive, transmit, process, store, or manage data and information associated with the secure identity propagation system 100. According to some implementations, the computer 402 may also include or be communicably coupled with an application server, e-mail server, web server, caching server, streaming data server, business intelligence (BI) server, and/or other server.

The computer 402 can receive requests over network 430 from a client application (e.g., executing on another computer 402) and respond to the received requests by processing the said requests in an appropriate software application. In addition, requests may also be sent to the computer 402 from internal users (e.g., from a command console or by another appropriate access method), external or third parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the interface 404 over the system bus 403 using an application programming interface (API) 412 and/or a service layer 413. The API 412 may include specifications for routines, data structures, and object classes. The API 412 may be either computer language-independent or -dependent and refer to a complete interface, a single function, or even a set of APIs. The service layer 413 provides software services to the computer 402 and/or the secure identity propagation system 100. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 and/or the service layer 413 as stand-alone components in relation to other components of the computer 402 and/or secure identity propagation system 100. Moreover, any or all parts of the API 412 and/or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402 and/or secure identity propagation system 100. The interface 404 is used by the computer 402 for communicating with other systems in a distributed environment—including within the secure identity propagation system 100—connected to the network 430 (whether illustrated or not). Generally, the interface 404 comprises logic encoded in software and/or hardware in a suitable combination and operable to communicate with the network 430. More specifically, the interface 404 may comprise software supporting one or more communication protocols associated with communications such that the network 430 or interface's hardware is operable to communicate physical signals within and outside of the illustrated secure identity propagation system 100.

The computer 402 includes a processor 405. Although illustrated as a single processor 405 in FIG. 4, two or more processors may be used according to particular needs, desires, or particular implementations of the computer 402 and/or the secure identity propagation system 100. Generally, the processor 405 executes instructions and manipulates data to perform the operations of the computer 402. Specifically, the processor 405 executes the functionality required for secure identity propagation in a cloud-based computing environment.

The computer 402 also includes a memory 406 that holds data for the computer 402 and/or other components of the secure identity propagation system 100. Although illustrated as a single memory 406 in FIG. 4, two or more memories may be used according to particular needs, desires, or particular implementations of the computer 402 and/or the secure identity propagation system 100. While memory 406 is illustrated as an integral component of the computer 402, in alternative implementations, memory 406 can be external to the computer 402 and/or the secure identity propagation system 100.

The application 407 is an algorithmic software engine providing functionality according to particular needs, desires, or particular implementations of the computer 402 and/or the secure identity propagation system 100, particularly with respect to functionality required for secure identity propagation in a cloud-based computing environment. For example, application 407 can serve as one or more components/applications described in FIGS. 1-6. Further, although illustrated as a single application 407, the application 407 may be implemented as multiple applications 407 on the computer 402. In addition, although illustrated as integral to the computer 402, in alternative implementations, the application 407 can be external to the computer 402 and/or the secure identity propagation system 100.

There may be any number of computers 402 associated with, or external to, the secure identity propagation system 100 and communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic disks, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media, and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user, and a keyboard and a pointing device, e.g., a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method, comprising:
   receiving, from a user application and at a cloud-based security token service (STS) executing in the same cloud domain name server (DNS) domain as a cloud application a first security response message used to generate a Token Granting Token (TGT) for generating a Service Token (ST), wherein the user application is external to the cloud DNS domain, and wherein the first security response message is generated externally to the cloud DNS domain by an Identity Provider (IDP) after successful verification of the user application following an attempted access by the user application of a protected resource in the cloud application;
   transmitting, from the STS and to the user application in response to receiving the first security response message, a second security response message, wherein the second security response message is generated by the STS, wherein the second security response message comprises the TGT, and wherein the TGT includes a unique identifier of the TGT and a unique identifier of the cloud application;
   receiving, at the STS and from the cloud application, a ST request, wherein the ST request comprises the TGT received from the user application;

verifying, at the STS, the ST request based on the TGT;

generating, at the STS and in response to the verifying, a ST, wherein the ST is used to validate an access request to access a backend system; and transmitting the ST from the STS to the cloud application.

2. The method of claim 1, wherein the TGT comprises a TGT digital signature, and wherein the verification of the ST request is based on the TGT digital signature.

3. The method of claim 2, wherein the TGT further comprises a lifetime parameter, and wherein the verification is further based on the lifetime parameter.

4. The method of claim 1, wherein the ST comprises a ST digital signature that is used in validating the access request.

5. The method of claim 4, wherein the ST further comprises a lifetime parameter, and wherein the lifetime parameter is used in the validation.

6. The method of claim 1, wherein the second security response message is transmitted from a cloud platform that hosts the cloud application.

7. The method of claim 1, wherein the first and the second security response messages are formatted according to a Security Assertion Markup Language (SAML) specification.

8. A system, comprising:

a memory;

at least one hardware processor interoperably coupled with the memory and configured to:

receive, from a user application and at a cloud-based security token service (STS) executing in the same cloud domain name server (DNS) domain as a cloud application a first security response message used to generate a Token Granting Token (TGT) for generating a Service Token (ST), wherein the user application is external to the cloud DNS domain, and wherein the first security response message is generated externally to the cloud DNS domain by an Identity Provider (IDP) after successful verification of the user application following an attempted access by the user application of a protected resource in the cloud application;

transmit, from the STS and to the user application in response to receiving the first security response message, a second security response message, wherein the second security response message is generated by the STS, wherein the second security response message comprises the TGT, and wherein the TGT includes a unique identifier of the TGT and a unique identifier of the cloud application;

receive, at the STS and from the cloud application, a ST request, wherein the ST request comprises the TGT received from the user application;

verify, at the STS, the ST request based on the TGT;

generate, at the STS and in response to the verifying, a ST, wherein the ST is used to validate an access request to access a backend system; and transmit the ST from the STS to the cloud application.

9. The system of claim 8, wherein the TGT comprises a TGT digital signature, and wherein the verification of the ST request is based on the TGT digital signature.

10. The system of claim 9, wherein the TGT further comprises a lifetime parameter, and wherein the verification is further based on the lifetime parameter.

11. The system of claim 8, wherein the ST comprises a ST digital signature that is used in validating the access request.

12. The system of claim 11, wherein the ST further comprises a lifetime parameter, and wherein the lifetime parameter is used in the validation.

13. The system of claim 8, wherein the second security response message is transmitted from a cloud platform that hosts the cloud application.

14. The system of claim 8, wherein the first and the second security response messages are formatted according to a Security Assertion Markup Language (SAML) specification.

15. A non-transitory, computer-readable medium storing computer-readable instructions for secure identity propagation, the instructions executable by a computer and configured to:

receive, from a user application and at a cloud-based security token service (STS) executing in the same cloud domain name server (DNS) domain as a cloud application a first security response message used to generate a Token Granting Token (TGT) for generating a Service Token (ST), wherein the user application is external to the cloud DNS domain, and wherein the first security response message is generated externally to the cloud DNS domain by an Identity Provider (IDP) after successful verification of the user application following an attempted access by the user application of a protected resource in the cloud application;

transmit, from the STS and to the user application in response to receiving the first security response message, a second security response message, wherein the second security response message is generated by the STS, wherein the second security response message comprises the TGT, and wherein the TGT includes a unique identifier of the TGT and a unique identifier of the cloud application;

receive, at the STS and from the cloud application, a ST request, wherein the ST request comprises the TGT received from the user application;

verify, at the STS, the ST request based on the TGT;

generate, at the STS and in response to the verifying, a ST, wherein the ST is used to validate an access request to access a backend system; and transmit the ST from the STS to the cloud application.

16. The medium of claim 15, wherein the TGT comprises a TGT digital signature, and wherein the verification of the ST request is based on the TGT digital signature.

17. The medium of claim 16, wherein the TGT further comprises a lifetime parameter, and wherein the verification is further based on the lifetime parameter.

* * * * *